United States Patent [19]

Isonaga

[11] Patent Number: 5,655,793
[45] Date of Patent: Aug. 12, 1997

[54] WEBBING HEIGHT ADJUSTER

[75] Inventor: Kazutomo Isonaga, Wako, Japan

[73] Assignee: Honda Motor Co., Ltd., Tokyo, Japan

[21] Appl. No.: 687,196

[22] Filed: Jul. 25, 1996

[30] Foreign Application Priority Data

Aug. 2, 1995 [JP] Japan .................................. 7-197425

[51] Int. Cl.$^6$ ...................................................... B60R 22/00
[52] U.S. Cl. ...................................... 280/801.2; 297/483
[58] Field of Search .................................. 280/801.2, 808;
297/483, 486, 468

[56] References Cited

U.S. PATENT DOCUMENTS 5,393,098  2/1995  Thomas et al. ...................... 280/801.2

FOREIGN PATENT DOCUMENTS

3514980  11/1985  Germany ............................ 280/801.2
2235127  2/1991  United Kingdom ................ 280/801.2
8003883  6/1988  WIPO ................................... 280/801.2

Primary Examiner—Christopher P. Ellis
Attorney, Agent, or Firm—Kanesaka & Takeuchi

[57] ABSTRACT

A webbing height adjuster of the present invention comprises a lock pin adjusting slider 3, a covering member 9 made of resin which is fixed to the lock pin adjusting slider 3, and a bolt 73 for supporting a slip anchor 75 which is fixed to the slider 3. A lock pin 5 is slidably inserted into an axial slot 41 of a column 40 of the covering member 9, and a lock pin biasing spring 7 is accommodated in the axial slot 41. The column 40 acts as a sliding guide of the lock pin 5. The column 40 is provided with a spring garnish mount portion 48 formed coaxially with the axial slot 41. The covering member 9 is provided with a guide groove 38 for guiding a lock pin control slider 10 pressing the lock pin 5. The guide groove 38 is formed integrally with the column 40. Therefore, the bolt can be manufactured in a simple structure at low cost and the thickness of the adjuster can be reduced.

5 Claims, 11 Drawing Sheets

Prior Art

WEBBING HEIGHT ADJUSTER

BACKGROUND OF THE INVENTION

The present invention relates to a webbing height adjuster used in a seat belt device for a vehicle to adjust the height position of the webbing.

Vehicles such as automobiles are provided with seat belt devices mounted to seats of the vehicles.

A three-point type seat belt device is an example of such conventional seat belt devices. The three-point type seat belt device comprises a shoulder belt for restraining the shoulder, chest, and abdomen of a vehicle occupant, and a lap belt continuously formed with the shoulder belt for restraining the hip of the occupant.

It is desirable that the webbing constituting the seat belt is worn by the occupant in such a position so as to fit the occupant as possible, in order to effectively restrain the occupant in an emergency and to allow the occupant to be in comfort without a sense of oppression. Because the shoulder belt supports the portion from the shoulder to the abdomen through the chest of the occupant, the shoulder belt is particularly desirable to be in such a position so as to fit the occupant. On the other hand, there is a wide variety of people who sits in the seat, such as a child, an adult of big body, an adult of small body and so on, that is, the body sizes of occupants are, of course, different. Therefore, the seat belt device is previously provided with a webbing height adjuster which can adjust the height position of the webbing for each occupant to allow the webbing to fit the occupant.

A webbing height adjuster disclosed in Japanese Patent Publication No. S63-48734 is one of such conventional webbing height adjusters.

Figure 11:
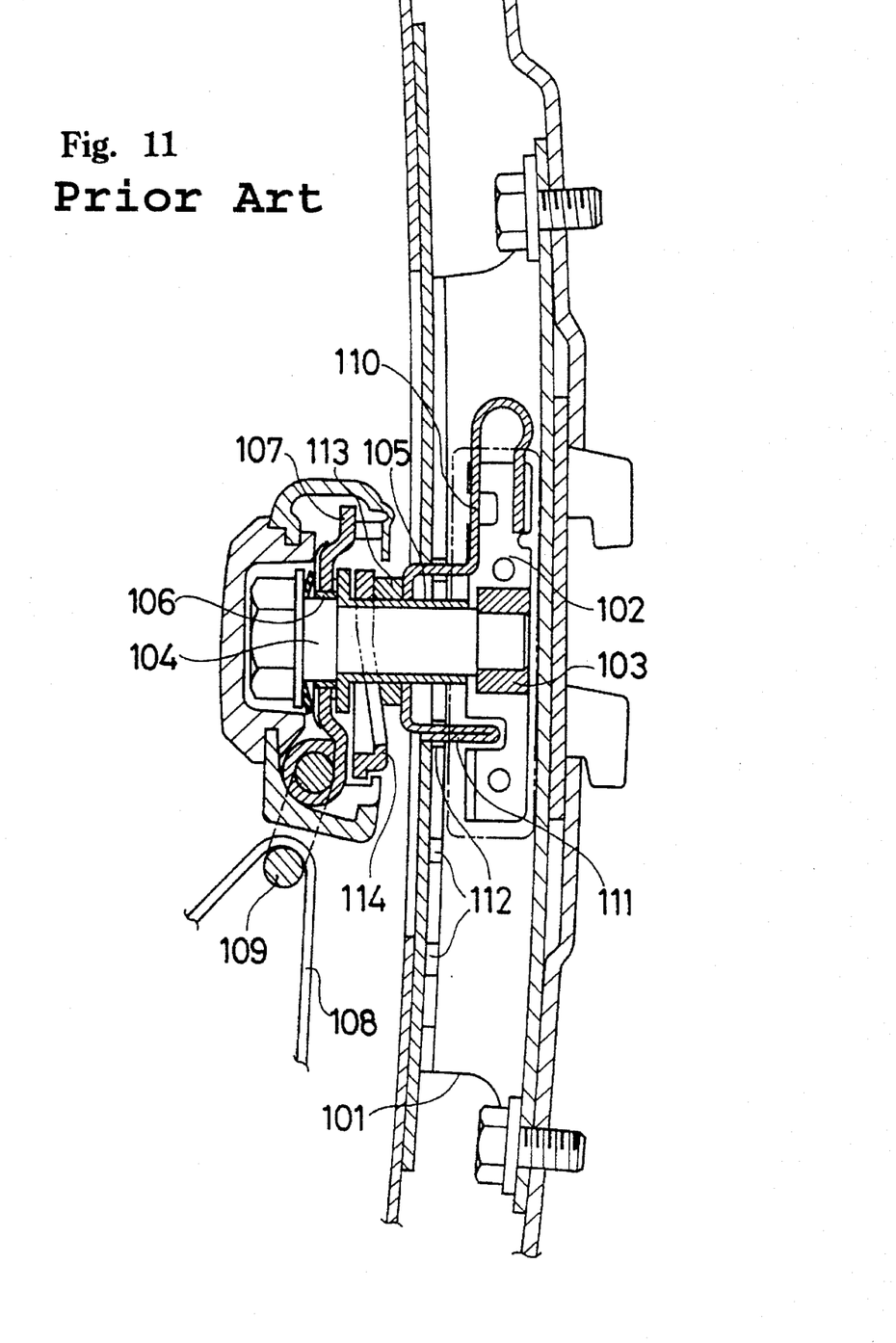
FIG. 11 is a longitudinal sectional view similar to FIG. 2 showing an example of conventional webbing height adjusters.

As shown in FIG. 11, the webbing height adjuster comprises a guide rail 101 fixed to a vehicle body, a slider 102 slidably fitted to the guide rail 101, a nut 103 fixed to the slider 102, an anchor bolt 104 screwed into the nut 103, a collar 106 fitted to the anchor bolt 104, an anchor plate 107 mounted on the anchor bolt 104 through the collar 106, a through ring 109 fixed to the anchor plate 107 for guiding the webbing 108, a lock spring 110 slidably fitted to the collar 105, a stopper 111 formed together with the lock spring 110, cavities 112 into one of which the stopper 111 is inserted for engaging, a cam 113 slidably fitted to the collar 105 to press the lock spring 110 in the axial direction, and a control lever 114 rotatably fitted to the collar 105 to generate force in the axial direction in cooperation with the cam 113.

In the webbing height adjuster, for adjusting the height position of the webbing, the control lever 114 is rotated so that a collar-contact portion of the lock spring 110 where is in contact with the collar 105 is pressed rightward in this figure by the cam 113, thereby releasing the stopper 111 from one of the cavities 112 to cancel the engagement with the guide rail 101. Therefore, the slider 102 is now slidable relative to the guide rail 101. After moving the slider 102 along the guide rail 101 to a desirable position, the control lever 114 is released so that the cam 113 is pressed leftward by the force of the lock spring 110. Because of the cam action, the control lever 114 is rotated to a nonoperational position and then the cam 113 and the collar-contact portion of the lock spring 110 also moves leftward. Therefore, the stopper 111 is inserted into a corresponding one of the cavities 112 so as to lock the movement of the slider 102. In this manner, the height position of the webbing 108 is adjusted.

By the way, since the locking mechanical components such as the control lever 114, the cam 113, and the lock spring 110 are supported by the anchor bolt 104 which also supports the anchor plate 107, the anchor bolt 104 must have a complex and special configuration, thereby increasing the cost. Moreover, for allowing each component to reliably exhibit its function, it is desirable to increase the accuracy of each component since a plurality of components intervene the anchor bolt 104, thereby further increasing the cost.

Since the anchor bolt 104 should be provided with not only a plurality of components arranged in the axial direction but also a margin for allowing the axial movement of the collar-contact portion of the lock spring 110 and the cam 113, the anchor bolt 104 must be long in the axial direction. This makes the webbing height adjuster relatively thick.

To overcome such problems, a webbing height adjuster which supports locking mechanical components not by an anchor bolt supporting an anchor plate is proposed in Japanese Utility Model Publication No. H7-6036.

Figure 12:
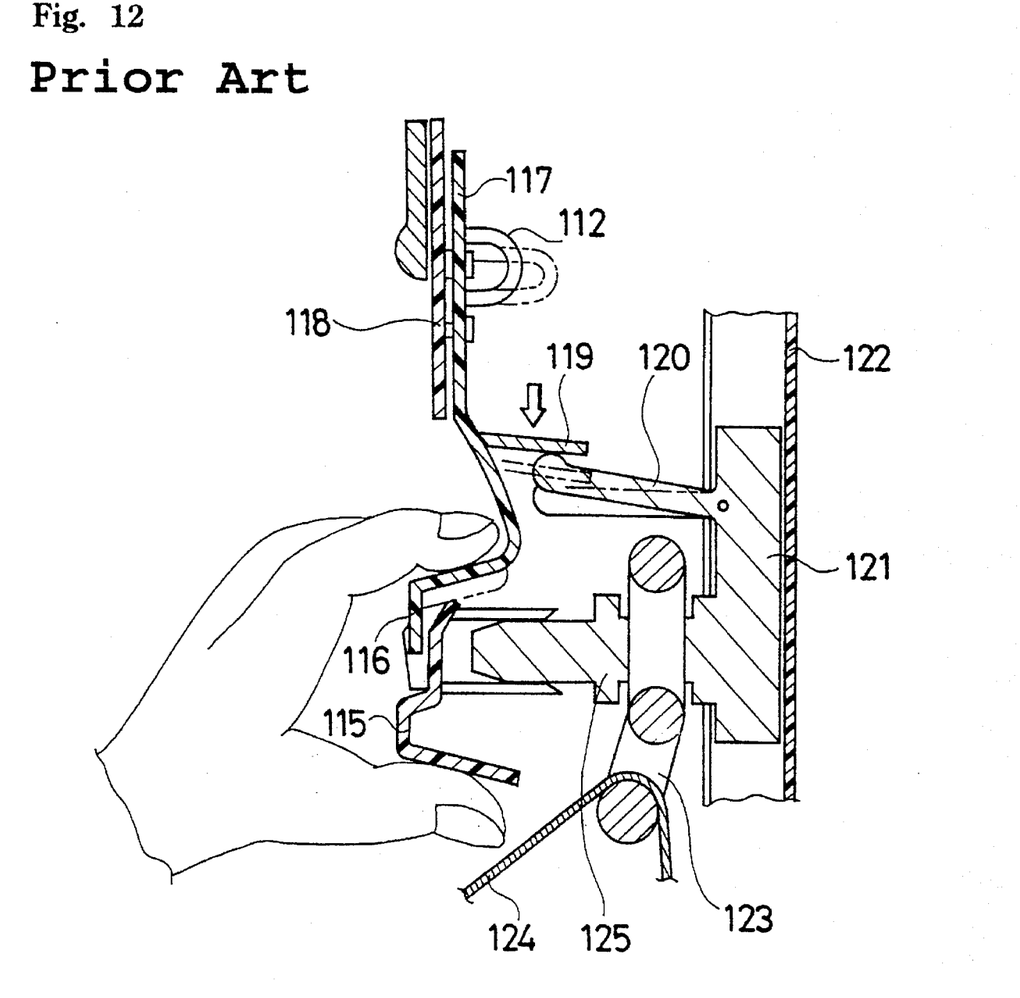
FIG. 12 is a vertical sectional view similar to FIG. 2 showing another example of the conventional webbing height adjusters.

As shown in FIG. 12, for adjusting the height position of the webbing in the webbing height adjuster of this publication, a fixing knob 115 and an operational knob 116 are pressed inwardly by grasping them so that an operational member 117 relatively moves downward in this figure relative to a slide plate 118. The relative movement of the operational member 117 makes a stopping piece 119 come into contact with a release lever 120 and presses the release lever 120 so that the release lever 120 is displaced to a position shown by two-dot lines. The displacement of the release lever 120 release a slide lock mechanism so as to allow the movement of a slider 121 along a rail 122. Therefore, the position of an anchor 123 can be adjusted by moving the slider 121 up and down with grasping the both knobs 115 and 116. After adjusting, the both knobs 115 and 116 are released from the grasped state so that the operational member 117 relatively moves upward relative to the slide plate 118 due to the biasing force of the spring 112. Therefore, the release lever 120 returns to the original position and slide lock mechanism locks the slider 121 and the anchor 123 from moving from this position.

In this manner, the height position of the webbing 124 can be adjusted to a suitable position corresponding to the body size of the occupant.

In the webbing height adjuster of Japanese Utility Model Publication No. H7-6036, however, a projection shaft 125 fixing to the anchor 123 is formed with the slider 121 as an integral part, thereby making the slider 121 complex. In addition, the projection shaft 125 supports not only the anchor 123 but also a slide plate 118, thereby making the projection shaft 125 also complex. This makes the cost of the slider 121 high. It is conceivable that the projection shaft 125 is placed by a bolt such as an anchor bolt 104 of the Japanese Patent Publication No. S63-48734 to solve such problems. However, in this case also, the bolt must supports the anchor 123 and the slide plate 118 so that the configuration should be complex and the cost should be still high.

In addition, since the projection shaft 125 supports the anchor 123 and the slide plate 118, the projection shaft 125 must be designed to be long in the longitudinal direction. Therefore, the problem that the webbing height adjuster must be thick is still remained.

Moreover, through Japanese Utility Model Publication No. H7-6036 does not disclose structure between the slide lock mechanism and the release lever 120, it is conceivable that the mechanical structure for transmitting the pivot movement of the release lever 120 to the slide lock mechanism is complex.

SUMMARY OF THE INVENTION

The present invention is made in consideration of the aforementioned circumstances and the object thereof is to provide a webbing height adjuster having the simplest possible structure to have the reduced thickness which is manufactured by reduced cost but securely functions.

For accomplishing the object, the present invention is characterized by a webbing height adjuster comprising: a guide rail fixed to a vehicle body and provided with a predetermined number of engaging portions formed in the longitudinal direction; a moving member slidably disposed on the guide rail; a webbing support mounted to the moving member by a mounting member; a slide cover mounted to the moving member; a locking means disposed on the moving member in such a manner that the locking means is movable in a direction of engaging and slipping off one of the engaging portions; a biasing means always biasing the locking means in a direction of engaging one of the engaging portions; and a lock releasing means for moving the locking means in a direction of slipping off the engaging portion against the biasing force of the biasing means, wherein the moving member is provided with a first slide guide for guiding the locking means and a slide cover mounting unit for mounting the slide cover, and the first slide guide and the slide cover mounting unit are disposed coaxially above the mounting member.

The present invention is further characterized in that the moving member is provided with an accommodating unit for accommodating the biasing means, and the accommodating unit is disposed coaxially with the locking means and the slide cover mounting unit.

The present invention is further characterized in that the lock releasing means is disposed in such a manner that the direction of the pushing force thereof for pushing the locking means in a direction of slipping off the engaging portion is the same as the direction that the locking means slides.

The present invention is further characterized in that the moving member is provided with a second slide guide, the lock releasing means is slidably disposed on the second slide guide, and the second slide guide is disposed about the first slide guide.

The present invention is further characterized in that the first slide guide and the second slide guide are integrally made of resin.

In the webbing height adjuster of the present invention as structured above, the mounting member supports only the webbing spporting member and no longer supports the locking means for locking the moving member, the biasing means for a/ways biasing the locking means, the locking mechanical components such as the lock releasing means, and the slide cover. Therefore, it no longer necessitate providing neither a mounting member of other parts than the webbing support nor a sliding member of the locking mechanical components and thus it no longer necessitates to make the mounting member to have complex and special structure, thereby simplifying the structure of the mounting member and allowing the manufacturing of the mounting member at low cost. Particularly, if the mounting member constitutes a bolt, the bolt may have simple structure and be manufactured at low cost.

The webbing height adjuster is formed in biaxial structure in which the mounting member supporting the webbing support and the locking mechanism are disposed in parallel, thereby allowing the mounting member and the locking mechanism to have simplified structure and allowing the mounting member and the lock mechanism to have shorter length in the axial direction. Therefore, the thickness of the webbing height adjuster can be reduced so that the space of the cabin is widened by the reduced thickness.

Since the accommodating unit for accommodating the biasing means, the locking means, and the cover mounting unit are disposed coaxially, the locking mechanism and the slide cover mounting unit may be structured in compact form.

The working axis of pushing force of the lock releasing means is substantially the same as the axis of the locking means. Since the pushing force is therefore exerted substantially uniformly to the locking means, the locking means can smoothly and securely slide, thereby improving the operability.

According to the present invention, the relative position between the first slide guide and the second slide guide is more accurately set. Therefore, since the pushing force of the lock releasing means can be further efficiently exerted, the locking means can further smoothly and securely slide.

According to the present invention, the first slide guide and the second slide guide are integrally made of resin so that the relative position between the first slide guide and the second slide guide is further accurately set and the resistance against sliding which is exerted on the lock releasing means and the locking means is small. Therefore, the lock releasing means and the lock means can moreover smoothly, noiselessly and securely slide.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Hereinafter, an embodiment of the present invention will be described with reference to attached drawings.

Figure 1:
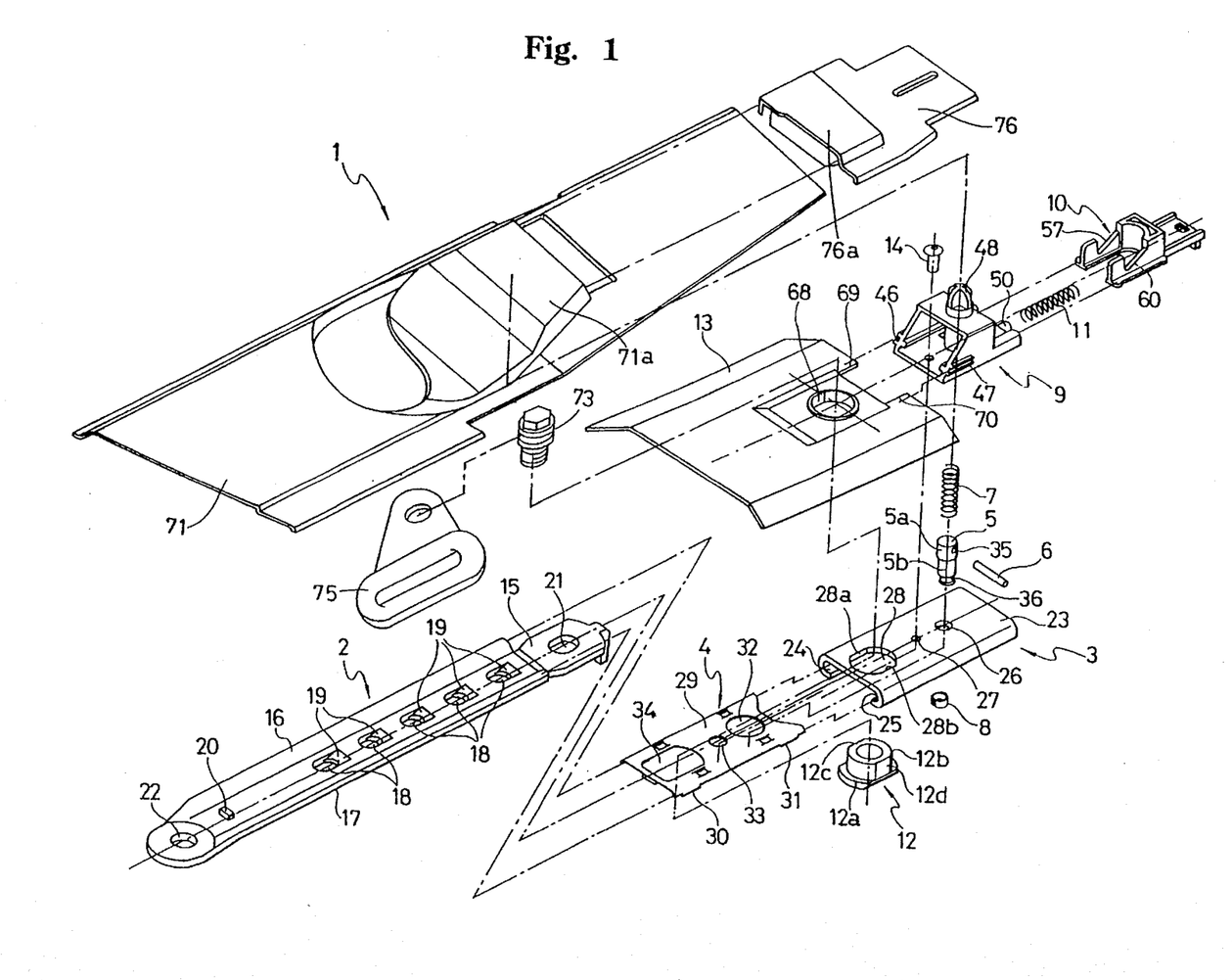
FIG. 1 is a exploded perspective view showing an embodiment of a webbing height adjuster according to the present invention.

As shown in FIG. 1, a webbing height adjuster 1 of this embodiment comprises a guide rail 2, a lock pin adjusting slider 3, a backlash and noise eliminator 4, a lock pin 5 comparable to the locking means of the present invention, a driven pin 6, a lock pin biasing spring 7 comparable to the biasing means of the present invention, a collar 8, a covering member 9, a lock pin control slider 10, a return spring 11, a nut 12, and a covering plate 13, and a rivet 14.

The guide rail 2 has a metal flat bar like body 15 and a pair of rail members 16 and 17 formed along the both side edges of the body 15 by bending the both side edges to extend in the longitudinal direction in parallel with each other. The central portion of the body 15 is provided with a predetermined number of engaging holes 18, 18, ... (in the shown case, five engaging holes) formed in line and equally spaced. As also clearly shown in FIG. 2, the body has slopes 19, 19, ... disposed on the right edges, in FIG. 1, of the engaging holes 18, 18, ... to slope downward to the engaging hole 18, 18, ... , respectively. These engaging holes 18, 18, ... are comparable to the engaging members of the present invention. The body 15 is also provided with a projection-like stopper 20 formed in a left end portion, in FIG. 1, of the central potion thereof by heaping up a portion of the central portion. The body 15 is further provided with mounting holes 21, 22, into which mounting bolts 77, 78 (shown in FIG. 2) are inserted, respectively, formed in left and right end portions, in FIG. 1, of the central portion thereof.

The lock pin adjusting slider 3 has a metal rectangular body 23 and a pair of grooves 24, 25 formed along the both side edges of the body 23 by bending the both side edges in U-like shape to extend in the longitudinal direction in parallel with each other. The grooves engage the pair of rail members 16, 17 of the guide rail 2, respectively to slide along them. The central portion of the body 23 is provided with a through hole 26 through which the lock pin 5 is inserted in such a manner that the lock pin 5 is slidable relative to the body 23, a rivet hole 27 through which the rivet 14 is inserted, and a nut through hole 28 through which the nut 12 is inserted. The nut through hole 28 has a pair of flat faces 28a, 28b formed on the inner periphery to extend in the longitudinal direction in parallel with each other.

The backlash and noise eliminator 4 has a resin rectangular plate-like body 29 and U-like groove forming parts, two of which are formed on each side of the body 29 (In FIG. 1, though only two groove forming parts 30, 31 on one side of the body 29 are shown, other two groove forming parts are formed on the other side in the same manner). The U-like groove forming parts engage the inner surfaces of the pair of grooves 24, 25 of the lock pin adjusting slider 3. The body 29 is provided with circular holes 32, 33 and a rectangular hole 34 formed in the central portion thereof in positions corresponding to the positions of the through hole 26, the rivet hole 27, and the nut through hole 28 of the lock pin adjusting slider 3, respectively. The circular holes 32, 33 are formed to have larger diameters than the diameters of the corresponding through hole 26 and the rivet hole 27. The rectangular hole 34 is formed in substantially the same configuration of the head portion 12a of the nut 12 so that the head portion 12a can be freely inserted into the rectangular hole 34. The backlash and noise eliminator 4 is designed to be in close contact with the surface of the lock pin adjusting slider 3, on which the pair of U-like grooves 24, 25 are formed, by elastic stress resulting form slight deformation of the backlash and noise eliminator 4 itself in such a positions that the holes 32, 33, 34 correspond to the holes 26, 27, 28, respectively.

The lock pin 5 is formed in a cylindrical shape with a step comprising large- and small-diameter parts. The large-diameter part 5a of the lock pin 5 is provided with a through hole 35 formed in the radial direction and the small-diameter part 5b is provided with an annular groove 36. The lock pin 5 and the driven pin 6 are assembled to form together T-like shape by inserting the driven pin 6 into the through hole 35 of the lock pin 5 (as shown in FIG. 5) and the C-like collar 8 is engaged to the annular groove 36 to form a periphery flush with the periphery of the small-diameter part 5b.

Figure 2:
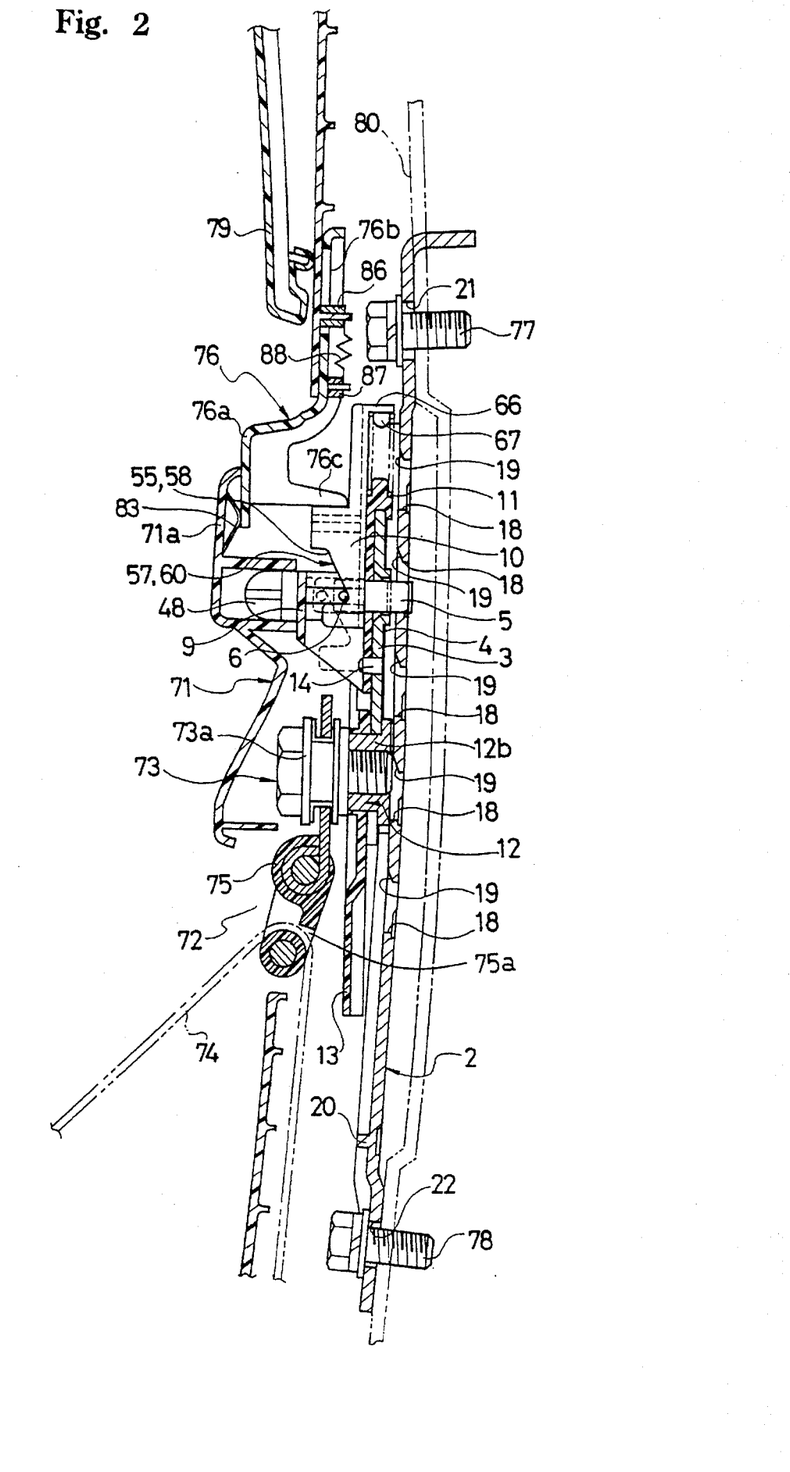
FIG. 2 is a longitudinal sectional view of the embodiment shown in FIG. 1.
Figure 3:
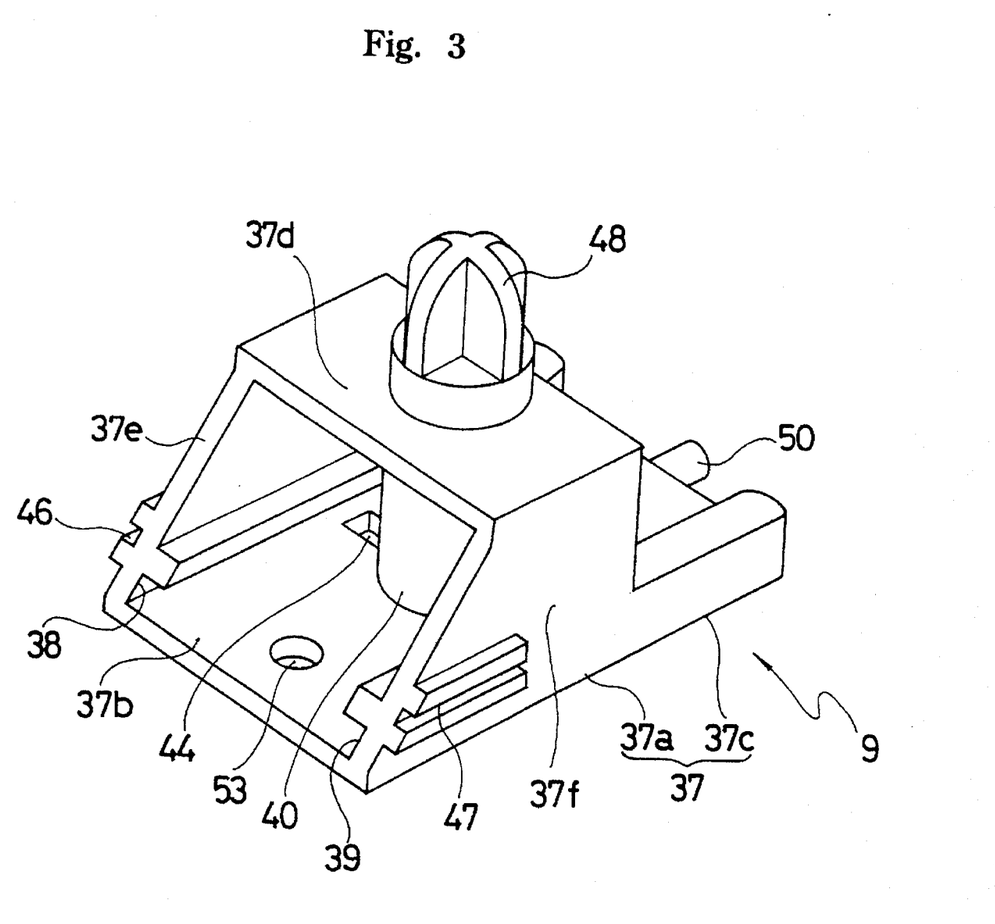
FIG. 3 is a perspective view of a covering member used in the embodiment shown in FIG. 1.

As shown in FIG. 3, the covering member 9 has a body 37 made of resin of which half in the longitudinal direction is a box-like portion 37a having a rectangular section and the other half comprises a slab portion 37c integrated with a bottom plate 37b of the box-like portion 37a. The box-like portion 37a increases the strength of the covering member 9 so that the covering member 9 can withstand force well when the operational force is exerted to the covering member 9 through an operating portion 71a of a slider garnish 71 (as shown in FIG. 2) as described later. That is, the box-like portion 37a acts as a reinforcement of the operational unit of the webbing height adjuster 1. The body 37 is provided with a pair of guide grooves 38, 39 extending in the longitudinal direction in parallel with each other. In this case, the center between the guide grooves 38 and 39 is positioned to the center of a column 40 (later described) of the covering member 9. As described later, the lock pin control slider 10 is guided by the guide grooves 38, 39 to slide. That is, the guide grooves 38, 39 are comparable to the second slide guide of the present invention.

Figure 4:
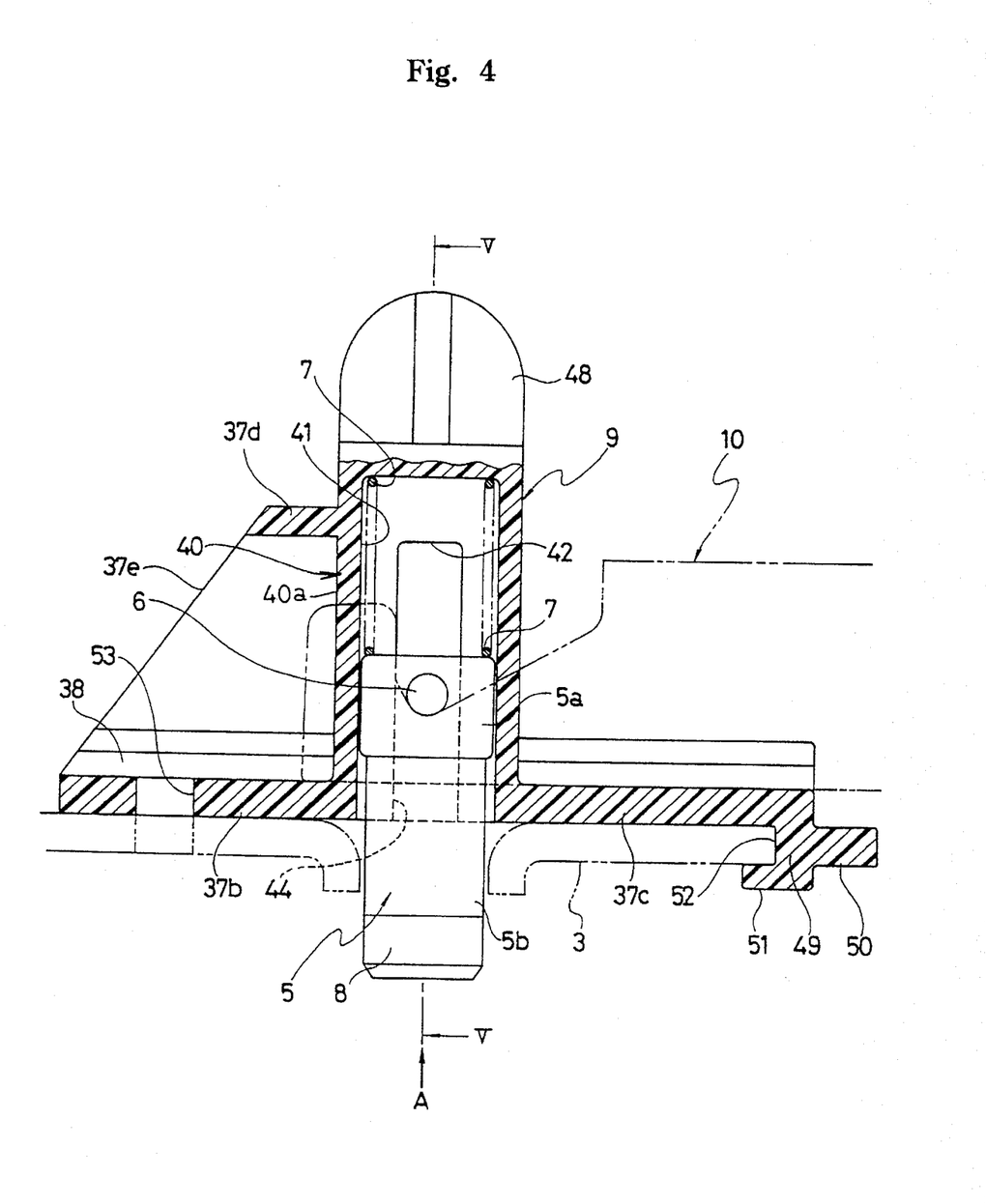
FIG. 4 is a side view, partly broken away, of the covering member shown in FIG. 3.

As shown in FIG. 4 in detail, the cylindrical column 40 is disposed in the center of the box-like portion 37a of the body 37 to stand straight on the bottom plate 37b to project from a top plate 37d. The column 40 and the bottom plate 37b have an axial slot 41 with bottom, opening at the bottom plate 37b side, of which a section is circular. Therefore, the axial slot 41 is formed integrally with the guide grooves 38, 39. The diameter of the axial slot 41 is designed to allow the large-diameter part 5a of the lock pin 5 to be slidably inserted into the axial slot 41. In addition, as shown in FIG. 4 and FIG. 5 in detail, the column 40 is provided with a pair of openings 42, 43 formed in side walls extending perpendicular to the longitudinal direction of the body 37 to extend in the longitudinal direction of the column 40 so as to allow the communication between the axial slot 41 to the outside of the column 40. Moreover, as clearly shown in FIG. 6, the bottom plate 37b is provided with a pair of openings 44, 45 extending perpendicular to the longitudinal direction of the body 2 to communicate with the openings 42, 43. The openings 42, 43 are designed in size to allow the driven pin 6 to be inserted to slide along the openings 42, 43 and the openings 44, 45 are designed in size to allow the passage of the driven pin 6.

Figure 5:
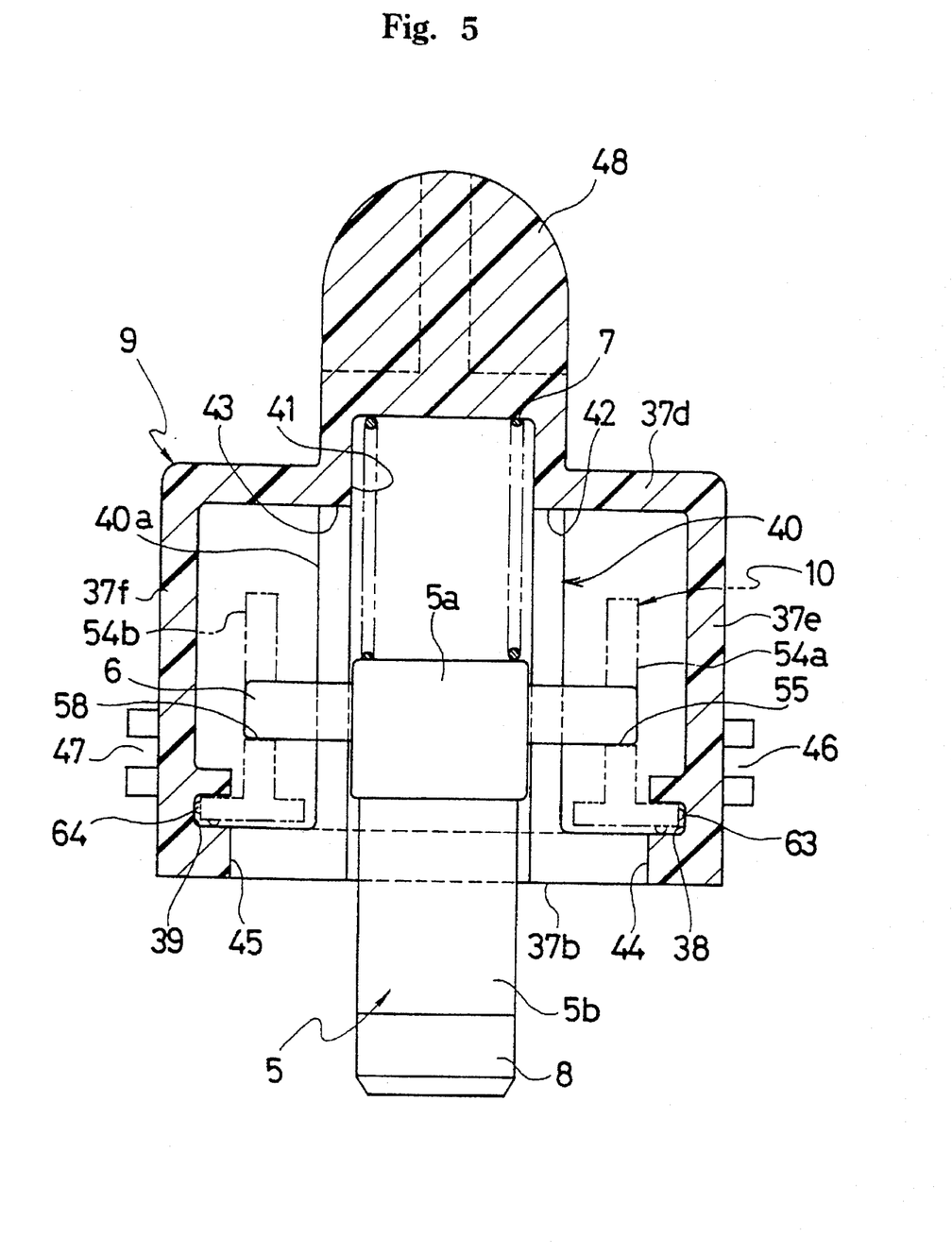
FIG. 5 is a sectional view taken along the line V—V in FIG. 4.

As shown in FIG. 4 and FIG. 5, the lock pin 5 is slidably inserted into the axial slot 41 of the column 40 and the lock pin biasing spring 7 is accommodated between the lock pin 5 and the bottom of the axial slot 41. That is, the column 40 is comparable to the first slide guide of the present invention for guiding the lock pin 5, as the lock means of the present invention, and the accommodating unit of the present invention for accommodating the lock pin biasing spring 7.

On the other hand, the box-like portion 37a has side plates 37e, 37f on the both sides, which have mounting grooves 46, 47 formed on the outer surfaces thereof, respectively, in the longitudinal direction. The column 40 is provided with a slider garnish mount portion 48. The slider garnish mount portion 48 is disposed coaxially with the central axis of the axial slot 41 which is the slider guide of the lock pin 5 and the accommodating unit for the lock pin biasing spring 7.

Figure 6:
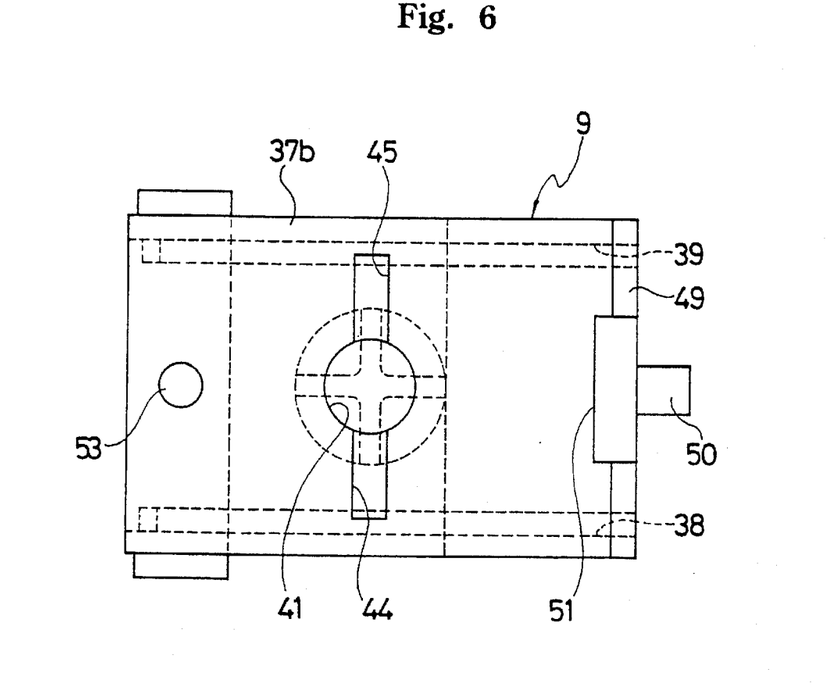
FIG. 6 is a bottom view of the covering member shown in FIG. 3.

Further, as shown in FIG. 4 and FIG. 6, the slab portion 37c has a vertical wall 49 extending downward from the edge of the slab portion 37c. The vertical wall 49 is provided with a spring support projection 50 formed in the center thereof in the longitudinal direction for supporting one end of a return spring 11. Moreover, the vertical wall 49 is provided with a projection 51 extending toward the box-like portion 37a, thereby forming an engaging groove 52 into which one end of the body 23 of the lock pin adjusting slider 3. The bottom plate 37b of the box-like portion 37a is provided with a rivet hole 53 into which the rivet 14 is inserted. The covering member 9 is fixed to the lock pin adjusting slider 3 by the rivet 14. The lock pin adjusting slider 3 and the covering member 9 are comparable to the moving member of the present invention.

Figure 7:
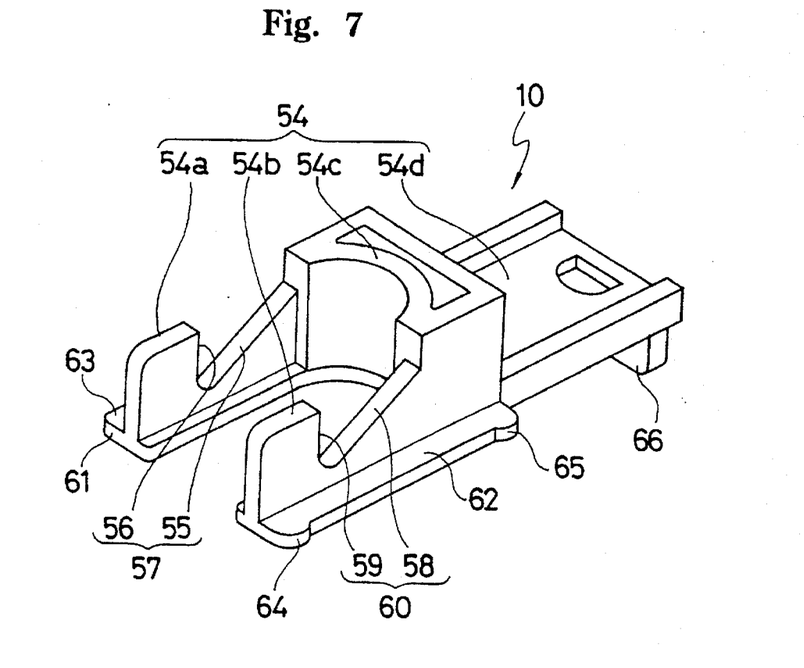
FIG. 7 is a perspective view of a lock pin control slider used in the embodiment shown in FIG. 1.

As shown in FIG. 7, the lock pin control slider 10 has a body 54 made of resin to have two legs which comprises a pair of side walls 54a, 54b, a connection portion 54c connecting the both side walls 54a and 54b, a slab portion 54d extending from the connection portion 54c in the longitudinal direction. One side wall 54a is provided with a cam groove 57 opening upward comprising a slant face 55 and a vertical face 56 and the other side wall 54b is also provided with a cam groove 60 opening upward comprising slant face 58 and a vertical face 59. The slant faces 55, 58 of the cam grooves 57, 60 press the lock pin 5 in such a direction that the lock pin 5 is inserted into the axial slot 41 through the driven pin 6 when the lock pin control slider 10 moves relative to the covering member 9, as described later. That is, the lock pin control slider 10 is comparable to the lock releasing means of the present invention.

The body 54 of the lock pin control slider 10 further comprises guides 61, 62 at the lower ends of the pair of side walls 54a, 54b, respectively, which are slidably engaged in the guide grooves 38, 39 of the covering member 9. Each guide 61, 62 has two small projections 63, 64, 65 (one small projection of the guide 61 is not shown and not marked) on an outer edge thereof, which come in contact with the vertical wall of each guide groove 38, 39. The distance between the guides 61 and 62 is set to be longer than the outer diameter of the column 40. The slab portion 54d is provided with a vertical wall 66 standing downward from the lower surface at the end thereof. As shown in FIG. 2, the vertical wall 66 is provided with a spring support projection 67 at the center thereof projecting in the longitudinal direction for supporting the other end of the return spring 11.

The nut 12 comprises the head portion 12a and a thread portion 12b and has a pair of flat faces 12c, 12d parallel to each other formed by cutting linearly outer peripheries of the head portion 12a and the thread portion 12b. The thread portion 12b is inserted into the nut through hole 28 of the lock pin adjusting slider 3 and, at the same time, the head portion 12a is engaged in the rectangular hole 34 of the backlash and noise eliminator 4. In this state, the flat face 12c of the nut 12 opposites the flat face 28a of the lock pin adjusting slider 3 and the flat face 12b of the nut 12 opposites the flat face 28b of the lock pin adjusting slider 3 so that the nut 12 is prevented from rotating relative to the lock pin adjusting slider 3.

The covering plate 13 has a through hole 68 into which the nut 12 is inserted not allowing the relative rotation and engaging portions 69, 70 which are engaged in the mounting grooves 46, 47 of the box-like portion 37a. As shown in FIG. 2, the covering plate 13 is disposed not to allow the guide rail 2 to be seen from the cabin through a webbing through hole 72 of the slider garnish 71 as described later.

Figure 8:
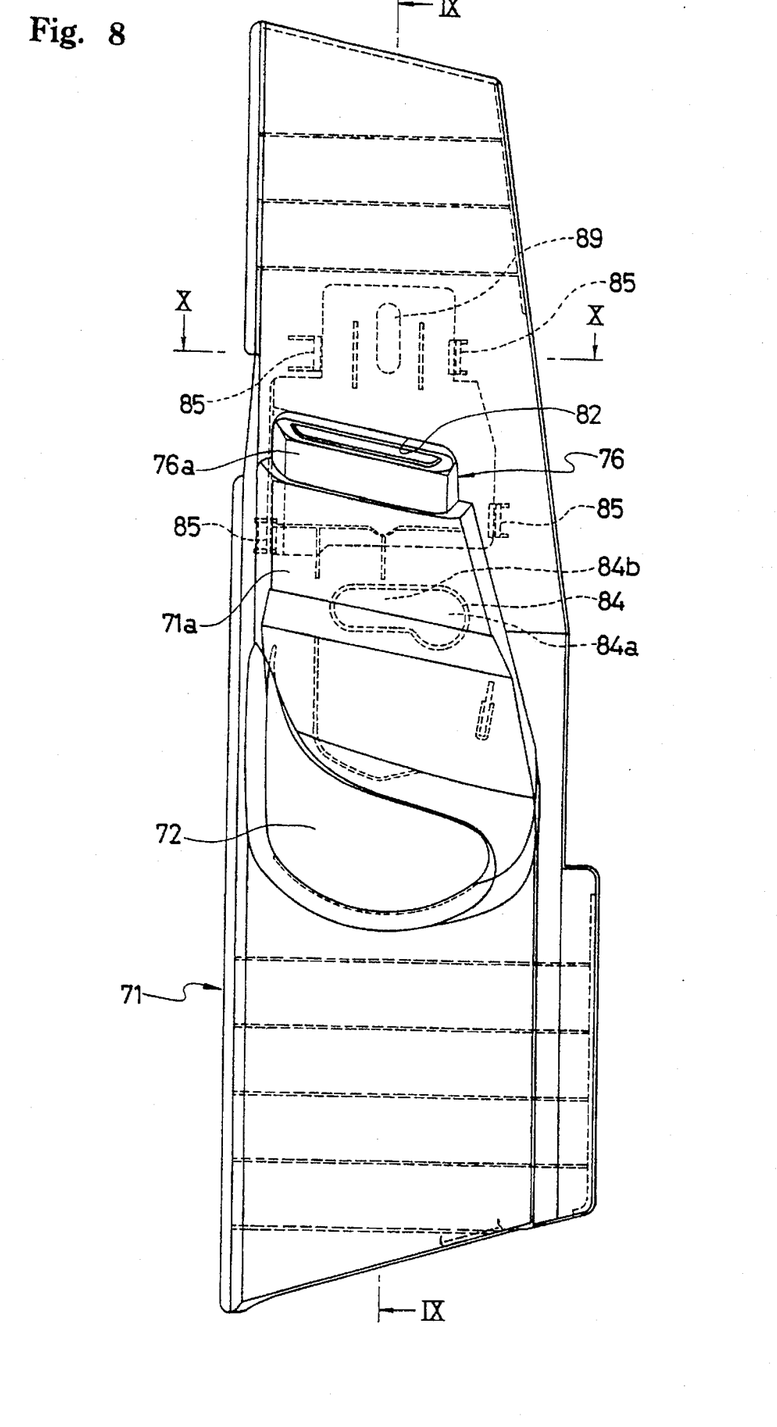
FIG. 8 is a front view of a slider garnish of the embodiment shown in FIG. 1.
Figure 9:
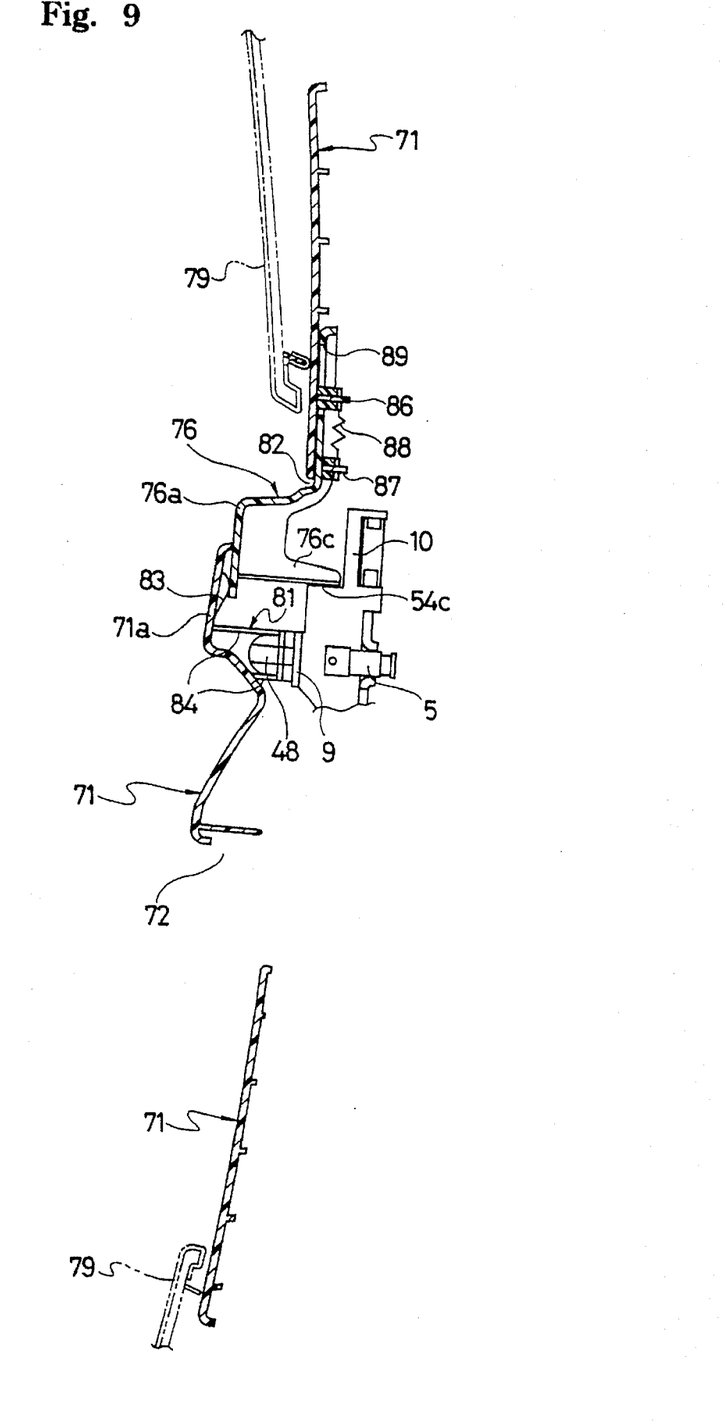
FIG. 9 is a sectional view taken along the line IX—IX in FIG. 8.

The webbing height adjuster 1 further comprises the slider garnish 71 and an operational member 76. As shown in FIG. 8 and FIG. 9, the slider garnish 71 is made of resin in a plate-like rectangle of which side of the vertical direction is longer than the other side and comprises a mounting portion 81 formed in the rear surface (the reverse side of the cabin-facing side) in the middle in the vertical direction of the slider garnish 71 to engage the slider garnish mount portion 48 of the covering member 9, the webbing through hole 72 formed in a position below the mounting portion 81, a knob through hole 82 into which a knob 76a of the operational member 76 is inserted, an operating portion 71a for controlling the webbing height adjuster 1, and ribs 83 supporting the knob 76a of the operational member 76.

The mounting portion 81 comprises a surrounding wall 84 formed on the rear surface of the slider garnish 71 in such a manner that it stands straight on the rear surface. The surrounding wall 84 comprises an insertion portion 84a of which inner diameter is larger than the outer diameter of the slider garnish mount portion 48 and an engaging portion 84b continuously disposed on the insertion portion 84a.

The slider garnish 71 is mounted on the moving members (the lock pin adjusting slider 3 and the covering member 9) to move together with the moving members for adjusting the height position of the webbing 74 and to cover the inside mechanism to disappear the inside mechanism from the cabin. The slider garnish 71 is comparable to the slide cover of the present invention.

The operational member 76 is made of resin by molding and comprises the knob 76a for controlling the webbing height adjuster 1, guiding portions 76b (shown in FIG. 10) which are slidably engaged to four stopper guides 85 (shown in FIG. 10) formed on the rear surface of the slider garnish 71, a transmitting portion 76c which comes into contact with the connection portion 54c of the lock pin control slider 10 to transmit the operational force exerted on the operational member 76 to the lock pin control slider 10.

Figure 10:
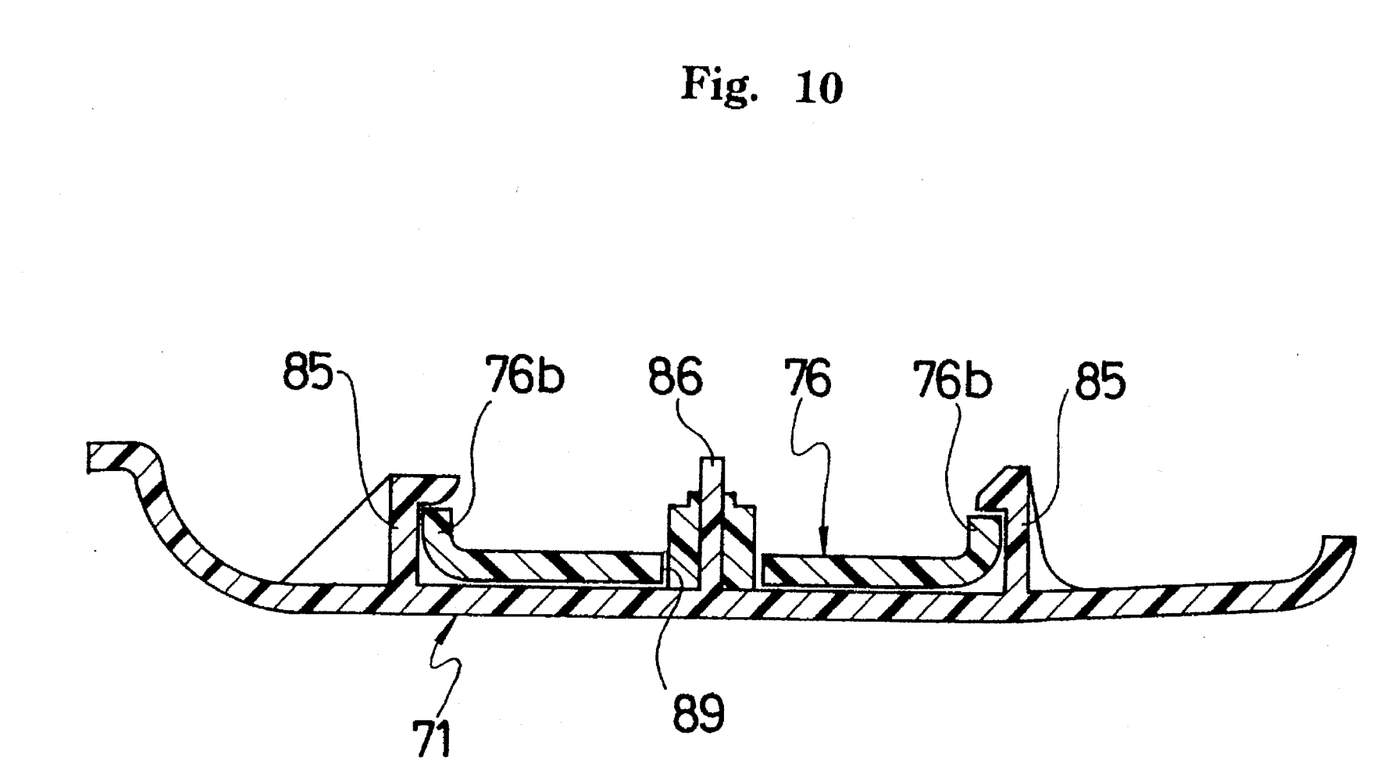
FIG. 10 is a sectional view taken along the line X—X in FIG. 8.

As shown in FIG. 10, guiding portions 76b in the upper side of the operational member 76 are slidably engaged to the grooves of the stopper guides 85. The other guiding portions 76b in the lower side of the operational member 76 are also slidably engaged to the grooves of the stopper guides 85. In this manner, the operational member 76 is slidably mounted to the slider garnish 71. In this case, the operational member 76 can be assembled in the slider garnish 71 by the stopper guides 85 and the ribs 83 so that the operational member 76 can smoothly slide without backlash. When the operational member 76 is assembled in the slider garnish 71, a part of the knob 76a is inserted into the knob through hole 82 to project outside the slider garnish 71. As shown in FIG. 2 and FIG. 9, the operational member 76 is always biased upward by a coil spring 88 disposed between a spring support 86 of the slider garnish 71 and a spring support 87 of the operational member 76 so that the operational member 76 is positioned in a non-operational position shown in FIG. 2 and FIG. 9 when not operating. The operational member 76 is provided with an elongated hole 89 elongated in the sliding direction into which the spring support 86 is inserted so that the operational member 76 can freely slide without blockage by the spring support 86 because of the play between the elongated hole 89 and the spring support 86.

As shown in FIG. 2, a slip anchor 75 has a through hole 75a through which the webbing 74 is fed and the slip anchor 75 is fixed to the lock pin adjusting slider 3 through a bolt 73 which is screwed into the nut 12 such that the slip anchor 75 can rotate relative to the bolt 73. In this embodiment, the bolt 73 is comparable to the mounting member of the present invention and the slip anchor 75 is comparable to the webbing support of the present invention.

In the webbing height adjuster 1 as structured above, the guide rail 2, the lock pin adjusting slider 3, the lock pin 5, the lock pin biasing spring 7, the covering member 9, the lock pin control slider 10, the slip anchor 71, and the bolt 73 are first assembled together.

On the other hand, the operational member 76 is assembled into the slider garnish 71 by engaging the guiding portions 76b of the operational member 76 into the stopper guides 85 of the slider garnish 71 and bringing the knob 76a into contact with the ribs 83.

The guide raft 2 is fixed to a predetermined position of a center pillar 80 by mounting bolts 77, 78 in such a manner that the slopes 19 of the engaging holes 18 are positioned in the upper side as shown in FIG. 2. After that, the slider garnish 71 assembled with the operational member 76 is fixed to the slider garnish mount portion 48 by fitting the insertion portion 84a of the surrounding wall 84 of the slider garnish 71 to the slider garnish mount portion 48 and moving the slider garnish 71 to engage the engaging portion 84b thereof to the slider garnish mount portion 48. In this manner, the webbing height adjuster 1 of this embodiment is assembled. Finally, a center pillar garnish 79 is mounted to the center pillar 80 to cover portions other than the operating portion 71a of the slider garnish 71, the webbing through hole 72, and the knob 76a of the operational member 76.

It should be noted that the operational member 76 and the lock pin control slider 10 may be integrally formed, in other words, the lock pin control slider 10 may be designed to function as the operational member 76 in addition to its function.

The description will now be made as regard to the operation of the webbing height adjuster 1 of this embodiment as described above.

As shown in FIG. 2, suppose the webbing height adjuster 1 is in state where the lock pin 5 is engaged to the second uppermost engaging hole 18 so that the lock pin adjusting slider 3 can not move up and down. In this state, the slip anchor 75 can not move up and down and the position thereof is fixed. When it is necessary to lower the position of the slip anchor 75 from this position in order to fit with the body of the occupant who is small such as a child, the operational member 76 are pressed downward against the slider garnish 71 by grasping the operating portion 71a and the knob 76a by fingers and the lock pin control slider 10 is then moved downward. At this point, the operational force of the operational member 76 is transmitted substantially equally to the both side walls 54a and 54b by the connection portion 54c. In addition, since the guides 61, 62 of the lock pin control slider 10 made of resin slide along the guide groove 38, 39 of the covering member 9 also made of resin, the lock pin control slider 10 can smoothly, noiselessly and securely slide because of small resistance against sliding.

As the lock pin control slider 10 is moved downward, the driven pin 6 is guided by the slant faces 55, 58 of the cam grooves 57, 60 to move leftward in FIG. 2, thereby also moving the lock pin 5 leftward, that is, in such a direction that the lock pin 5 slips off the engaging hole 18. At this point, since the force that the slant faces 55, 58 of the cam grooves 57, 60 press the driven pin 6 and the axial slot 41 are coaxial and the covering member 9 is made of resin, the resistance against sliding is so small that the lock pin 5 can smoothly, noiselessly and securely slide. The lock pin 5 completely slips off the engaging hole 18 when the driven pin 6 reaches the uppermost position of the slant faces 55, 58 of the cam grooves 57, 60 as shown by two-dotted lines by the further downward movement of the lock pin control slider 10. This makes the lock pin adjusting slider 3 slidable up and down.

In this state, the lock pin adjusting slider 3 is moved downward by pressing the slider garnish 71 and the operation member 76 downward with grasping the operating portion 71a and the knob 76a. At this point, the operational force is transmitted from the operating portion 71a to the covering member 9. Since the strength of the covering member 9 is increased by the box-like portion 37a, the covering member 9 can withstand the operational force well. By releasing the operating portion 71a and the knob 76a when the webbing is in the best position to fit with the body of the occupant, the lock pin control slider 10 moves upward by the biasing force of the return spring 11 and the lock pin 5 moves rightward by the biasing force of the lock pin biasing spring 7. When the lock pin 5 completely faces one of the engaging holes 18 at this point, the lock pin 5 engages into the engaging hole 18 so as to prevent the lock pin adjusting slider 3 from moving up and down. In such a manner, the slip anchor 75 is held in another position where the webbing successfully fits with the body of the occupant. On the other hand, when the lock pin 5 faces a part of guide rail 2 between the adjacent engaging holes 18 and 18, the lock pin 5 comes into contact with the guide rail 2 not to engage into one of the engaging holes 18. In this case, by grasping the operating portion 71a and moving the slider garnish 71 up or down to finely adjust the position of the lock pin 5, the lock pin 5 is engaged into one of the engaging holes 18. In such a manner, the webbing is in such a position that substantially fits with the body of the occupant.

It should be noted that the lock pin adjusting slider 3 is prevented form moving downward because the lock pin adjusting slider 3 comes into contact with the stopper 20.

When it is necessary to rise the position of the slip anchor 75 from the position shown in FIG. 2 in order to fit with the body of the occupant such as an adult of big body, the operational member 76 are pressed downward so that the lock pin 5 completely slips off the engaging hole 18 to allow the vertical movement of the lock pin adjusting slider 3 in the same manner as the case of lowering the slip anchor 75. In this state, in the inverse manner of the case of lowering the slip anchor 75 described above, the lock pin adjusting slider 3 is moved upward by pressing the slider garnish 71 together with the operational member 76 upward. Since the operation after that is completely the same as the case of lowering the position of the slip anchor 75, the description will be omitted. It should be noted that even when the lock pin 5 is engaged into the other engaging hole 18 than the engaging hole 18 shown in FIG. 2, the webbing height adjuster 1 operates in the same manner.

In the webbing height adjuster 1 of this embodiment as structured above, the bolt 73 supports only the slip anchor 75 and no longer supports the locking mechanical components such as the lock pin 5 for locking the lock pin adjusting slider 3 and slide garnish 71. Therefore, it does not necessitate providing neither a mounting member of the slider garnish 71 nor a sliding member of the locking mechanical components. Therefore, it no longer necessitates to make the bolt 73 having complex and special structure. This simplifies the configuration of the bolt 73 and allows the manufacturing of the bolt 73 at low cost.

The bolt 73 supporting the slip anchor 75 and the locking mechanism are disposed in parallel to form a biaxial structure, thereby allowing both the bolt 73 and the locking mechanism to have simplified structure and allowing the bolt 73 and the lock mechanism to have shorter length in the axial direction. Therefore, the thickness of the webbing height adjuster 1 can be reduced so that the space of the cabin is widened by the reduced thickness.

Moreover, the driven pin 6 fitted in the lock pin 5 is positioned to pass along the central axis of the axial slot 41 of the column 40 in which the lock pin 5 slides and the working axis of releasing force which is exerted to the driven pin 6 by the lock pin control slider 10 by the operational force of the operational member 76 is also substantially the same as the central axis, the releasing force is exerted substantially uniformly to the lock pin 5. Therefore, the lock pin 5 can smoothly and securely slide relative to the axial slot 41 of the column 40, thereby improving the operability. In this case, since the guide grooves 38, 39 and the axial slot 41 of the covering member 9 are integrally made of resin, the resistance against sliding between the lock pin control slider 10 and the lock pin 5 is small and the positional accuracy between the guide grooves 38, 39 and the axial slot 41 is improved so that the lock pin 5 and the lock pin control slider 10 can further smoothly, noiselessly and securely slide.

Since the box-like portion 37a of the covering member 9 acts as a reinforcement of the operational members of the webbing height adjuster 1, the strength of the slider garnish 71 having the operating portion 71a can be reduced, thereby allowing the thickness of the slider garnish 71 to be reduced. This can also reduce the weight of the slider garnish 71, thereby reducing the weight and the thickness of the webbing height adjuster 1.

Furthermore, since the driven pin 6 is positioned in the box-like portion 37a of the covering member 9, the driven pin 6 is hidden by the covering member 9, thereby improving the appearance.

In addition, the lock pin biasing spring 7 biasing the lock pin 5 is disposed between the both side walls 54a, 54b of the lock pin control slider 10, thereby allowing the lock pin 5 to have shorter length. This also reduces the thickness of the webbing height adjuster 1 and facilitates the attachment of the webbing height adjuster even when it should be mounted on a narrow portion of the vehicle body such as a center pillar.

Though the second slide guide of the present invention constitutes the guiding grooves 38, 39 in the above embodiment, the present invention is not limited to this and the second slide guide may constitute the outer wall 40a of the column 40. In this case, the inner peripheral portions of the two legs of the lock pin control slider 10 are guided to slide by the outer wall 40a of the column 40. Though the lock pin control slider 10 comparable to the lock releasing means of the present invention slides in a direction perpendicular to the axial direction of the column 40 comparable to the first slide guide, it may slide in the axial direction of the column 40.

As apparent from the above description, according to the webbing height adjuster of the present invention, it no longer necessitate providing neither a mounting member of other parts than the webbing support nor a sliding member of the locking mechanical components, thereby simplifying the structure of the mounting member and allowing the manufacturing of the mounting member at low cost. Particularly, if the mounting member constitutes a bolt, the bolt may have simple structure and be manufactured at low cost.

The webbing height adjuster is formed in biaxial structure in which the mounting member supporting the webbing support and the locking mechanism are disposed in parallel, thereby allowing the mounting member and the locking mechanism to have simplified structure and allowing the mounting member and the lock mechanism to have shorter length in the axial direction. Therefore, the thickness of the webbing height adjuster can be reduced so that the space of the cabin is widened by the reduced thickness.

According to the present invention, since the accommodating unit for accommodating the biasing means, the locking means, and the cover mounting unit are disposed coaxially, the locking mechanism and the slide cover mounting unit may be structured in compact form.

According to the present invention, since the working axis of pushing force of the lock releasing means is substantially the same as the axis of the locking means, the pushing force is exerted substantially uniformly to the locking means. Therefore, the locking means can smoothly and securely slide, thereby improving the operability.

According to the present invention, since the relative position between the first slide guide and the second slide guide is more accurately set, the pushing force of the lock releasing means can be further efficiently exerted so that the locking means can further smoothly and securely slide.

According to the present invention, the first slide guide and the second slide guide are integrally made of resin so that the relative position between the first slide guide and the second slide guide is further accurately set and the resistance against sliding which is exerted on the lock releasing means and the locking means is small. Therefore, the lock releasing means and the lock means can moreover smoothly, noiselessly and securely slide.

What we claim is:

1. A webbing height adjuster comprising:
    a guide rail fixed to a vehicle body and provided with a predetermined number of engaging portions formed in the longitudinal direction;
    a moving member slidably disposed on the guide rail;
    a webbing support mounted to the moving member by a mounting member;
    a slide cover mounted to the moving member;
    a locking means disposed on the moving member in such a manner that the locking means is movable in a direction of engaging and slipping off one of the engaging portions;
    a biasing means always biasing the locking means in a direction of engaging one of the engaging portions; and
    a lock releasing means for moving said locking means in a direction of slipping off the engaging portion against the biasing force of said biasing means, wherein
    said moving member is provided with a first slide guide for guiding said locking means and a slide cover mounting unit for mounting said slide cover, and said first slide guide and said slide cover mounting unit are disposed coaxially above said mounting member.

2. A webbing height adjuster as claimed in claim 1, wherein said moving member is provided with an accommodating unit for accommodating said biasing means, and said accommodating unit is disposed coaxially with said locking means and said slide cover mounting unit.

3. A webbing height adjuster as claimed in claim 1, wherein said lock releasing means is disposed in such a manner that the direction of the pushing force thereof for pushing said locking means in a direction of slipping off the engaging portion is the same as the direction that said locking means slides.

4. A webbing height adjuster as claimed in claim 1, wherein said moving member is provided with a second slide guide, the lock releasing means is slidably disposed on said second slide guide, and said second slide guide is disposed about said first slide guide.

5. A webbing height adjuster as claimed in claim 4, wherein said first slide guide and said second slide guide are integrally made of resin.

* * * * *